United States Patent
Qu et al.

(10) Patent No.: US 11,952,642 B2
(45) Date of Patent: Apr. 9, 2024

(54) METHOD FOR LEACHING PLATINUM GROUP METALS FROM SPENT CATALYST BY UV-VIS

(71) Applicant: DALIAN UNIVERSITY OF TECHNOLOGY, Liaoning (CN)

(72) Inventors: Zhenping Qu, Liaoning (CN); Xinna Zhao, Liaoning (CN); Hui Wang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 18/512,770

(22) Filed: Nov. 17, 2023

(65) Prior Publication Data
US 2024/0084420 A1    Mar. 14, 2024

(30) Foreign Application Priority Data

Nov. 18, 2022 (CN) .......................... 202211444213.4

(51) Int. Cl.
    C22B 11/00    (2006.01)
    C22B 1/248    (2006.01)

(52) U.S. Cl.
    CPC ............ C22B 11/048 (2013.01); C22B 1/248 (2013.01)

(58) Field of Classification Search
None
See application file for complete search history.

(56) References Cited

FOREIGN PATENT DOCUMENTS

| CN | 104032143 A | * | 9/2014 |
| KR | 20090114619 A | * | 11/2009 |
| KR | 101366697 B1 | * | 2/2014 |

OTHER PUBLICATIONS

English translation of KR 101366697 B1 Description (Year: 2014).*
English translation of KR 20090114619 A Description (Year: 2009).*
English translation of CN-104032143-A Description (Year: 2014).*
Tyutereva, Y. E., et al. Photodegradation of para-arsanilic acid mediated by photolysis of iron(III) oxalate complexes. Chemosphere 261 (2020) 127770. (Year: 2020).*

(Continued)

*Primary Examiner* — Anthony J Zimmer
*Assistant Examiner* — Zachary John Baum
(74) *Attorney, Agent, or Firm* — Muncy, Geissler, Olds & Lowe, P.C.

(57) ABSTRACT

The present invention belongs to the field of recovery of secondary resources of noble metals, and discloses a method for leaching platinum group metals from spent catalyst by UV-vis, which uses ferric oxalate complex/hydrogen peroxide-chloride salt solution as a solvent for extracting platinum group metals under the condition of UV-vis, converts the platinum group metals from metallic state to platinum group metal complex, and obtains platinum group metal lixivium to realize the leaching of the platinum group metals. The platinum leaching rate of the method of the present invention can reach more than 97%. The present invention has mild reaction conditions, realizes the green recovery of platinum group metals from spent catalyst, avoids the use of strong acids and bases and toxic substances and avoids the production of toxic gases in the leaching process, so as to reduce the environmental hazards of the spent catalyst.

3 Claims, 1 Drawing Sheet

(56) References Cited

OTHER PUBLICATIONS

Atia T A, Spooren J., "Fast microwave leaching of platinum, rhodium and cerium from spent non-milled autocatalyst monolith", Chemical Engineering & Processing Process Intensification, 2021, 164108378, 8 pages.

Trinh H B, Lee J C, Srivastava R R, et al., "Eco-threat Minimization in HCl Leaching of PGMs from Spent Automobile Catalysts by Formic Acid Prereduction", ACS Sustainable Chemistry & Engineering, 2017, 5, 7302-7309.

Shams K, Beiggy M R, Shirazi A G., "Platinum recovery from a spent industrial dehydrogenation catalyst using cyanide leaching followed by ion exchange", Applied Catalysis A General, 2004, 258, 227-234.

Nguyen V T, Riao S, Aktan E, et al., "Solvometallurgical Recovery of Platinum Group Metals from Spent Automotive Catalysts", ACS Sustainable Chemistry & Engineering, 2021, 9, 337-350.

Chen, Y., Xu, M., Wen, J. et al., "Selective recovery of precious metals through Photocatalysis", Nature Sustainability, 2021, 4, 618-626.

* cited by examiner

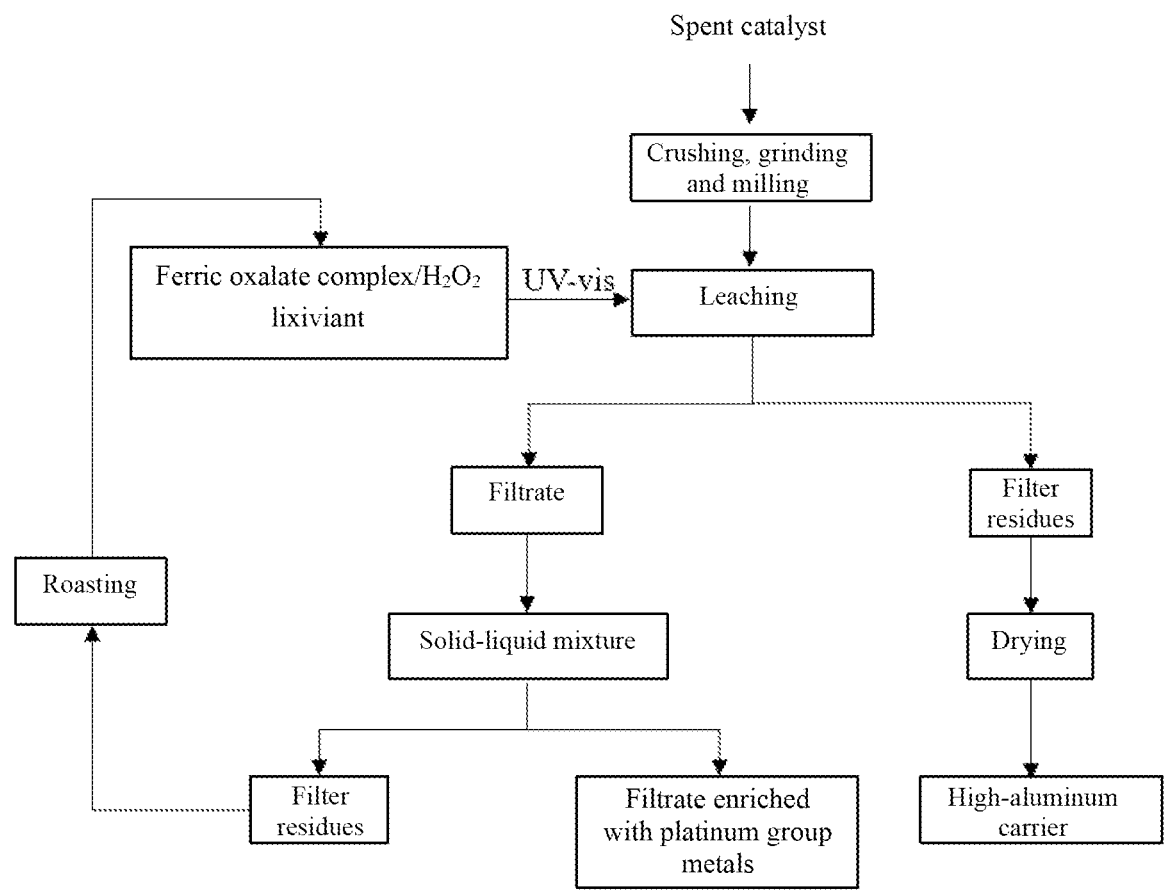

METHOD FOR LEACHING PLATINUM GROUP METALS FROM SPENT CATALYST BY UV-VIS

TECHNICAL FIELD

The present invention belongs to the field of recovery of secondary resources of noble metals, and relates to a method for leaching platinum group metals from spent catalyst by UV-vis, in particular to a method for leaching platinum group metals from spent catalyst by UV-vis/ferric oxalate complex/hydrogen peroxide-chloride salt as a solvent.

BACKGROUND

Noble metals have strong anti-corrosion and oxidation resistance and are widely used in the fields of electronic component manufacturing, energy storage and petrochemical industry. Platinum group metals show excellent physical and chemical properties and high catalytic activity, and are widely used in the fields of environmental protection and petrochemical industry. At present, the demand for platinum group metals is still increasing, but the resources of platinum group metals are in short supply, and the reserves of platinum group metals are low and are not distributed unevenly. The platinum group metals generally exist in paragenetic or associated minerals, which leads to high production cost and great environmental damage. According to statistics, the annual consumption of solid catalyst in the world is about 800,000 t, catalyst is inactivated due to poisoning, sintering and other reasons, and spent catalyst produced is about 500,000-700,000 t. Spent catalyst is a kind of hazardous waste, which not only pollutes the environment but also causes harm to human health in case of long-term stacking. The spent catalyst contains abundant platinum resources, in which the content of platinum group metals is much higher than that in the ore, and the recovery cost and the environmental impact are much lower than those of mining of the associated ore. Therefore, the recovery of platinum group metals from secondary resources not only creates economic and environmental benefits, but also is in line with the current global trend towards carbon neutrality. At present, the main hydrometallurgy recovery methods for platinum group metals include acid leaching, cyanide leaching, organic solvent treatment and photocatalysis-organic solvent treatment.

The acid leaching technology is to use aqua regia to recover platinum group metals from the ore. Due to strong corrosion of aqua regia, many scholars have proposed milder HCl/oxidizer methods. Atia uses $HCl/Cl_2$ to recover 99% platinum (Pt) from spent catalyst (Atia T A, Spooren J. Chemical Engineering & Processing: Process Intensification, 2021, 164:108378), and Ha Bich Trinh uses $HCl/NaClO_3$ to leach 81% Pt from spent automotive catalyst, but this method inevitably produces toxic gases such as $Cl_2$, which causes harm to the human body (Trinh H B, Lee J C, Srivastava R R, et al. ACS Sustainable Chemistry & Engineering, 2017, 5, 7302-7309). CN104480312A discloses a method for recovering platinum group metals from automotive catalyst, which uses the solution of NaCl, $NaClO_3$ and $H_2SO_4$ for chlorination during acid leaching. The operation process of the method in this solution is complicated, the recovery cost is high, and toxic gases such as $Cl_2$ are easily produced.

In addition to acidic media, platinum group metals can also be leached by cyanation. Shams et al. uses the aqueous cyanide solution of basic metals to recover 95% Pt (Shams K, Beiggy M R, Shirazi A G. Applied Catalysis A: General, 2004, 258, 227-234). CN201510259346.8 discloses a method for recovering selenium, mercury, gold and silver from acidic slag, which extracts gold and silver from roasted residues by cyanation to realize the recovery of gold and silver from acidic slag. However, cyanide is a highly lethal substance that rapidly interacts with carbon dioxide to form hydrocyanic acid (HCN) in the air, which can cause respiratory paralysis and death.

In order to avoid the use of highly toxic cyanide, many scholars use organic substances such as $SOCl_2$, DMSO, $CH_3CN$ and DMF to dissolve Pt under mild conditions, and the dissolution rate is high (Nguyen V T, Riao S, Aktan E, et al. ACS Sustainable Chemistry & Engineering, 2021, 9, 337-350). Chen et al. proposes to recover platinum group metals from the mixed solution of $CH_3CN$ and $CH_3Cl_2$ by photocatalysis, which can recover more than 99% of target metal (Chen, Y, Xu, M., Wen, J. et al. Nature Sustainability, 2021,4, 618-626). CN110484746A discloses a noble metal lixiviant and a method for recovering noble metals from spent catalyst, which uses the mixed solution of ionic liquid methyl tributyl ammonium chloride, acetone and acetonitrile to recover 96% ruthenium (Ru). Such methods prevent the production of toxic gases such as $Cl_2$ and HCN, but the toxicity of volatile organic compounds used cannot be ignored.

Although a hydrometallurgy method for recovering platinum group metals is provided in the above technologies, there are still problems with the use of strong acids and bases and volatile organic compounds. At present, the key to recover platinum group metals is to find a green non-toxic hydrometallurgy method.

SUMMARY

The purpose of the present invention is to provide a method for recovering platinum group metals from spent catalyst by UV-vis to realize the green recovery of platinum group metals from spent catalyst, avoid the use of strong acids and bases and toxic substances and avoid the production of toxic gases in the leaching process, so as to reduce the environmental hazards of the spent catalyst.

The method for recovering platinum group metals from spent catalyst by UV-vis of the present invention uses ferric oxalate complex/hydrogen peroxide-chloride salt solution as a solvent for extracting platinum group metals under the condition of UV-vis to produce reactive oxygen species (ROS), converts the platinum group metals from metallic state to platinum group metal complex, and obtains platinum group metal lixivium to realize the leaching of the platinum group metals. The platinum leaching rate of the method of the present invention can reach more than 97%.

The present invention adopts the following technical solution:

A method for leaching platinum group metals from spent catalyst by UV-vis, which uses ferric oxalate complex/hydrogen peroxide-chloride as a solvent for extracting platinum group metals from spent catalyst under the condition of UV-vis to obtain platinum group metal lixivium, so as to effectively recover platinum group metals from spent catalyst;

The method comprises the following specific steps:
(1) Shearing spent catalyst, crushing to 80-200 meshes, and sieving for later use;
(2) Preparing platinum group metal lixiviant: uniformly mixing ferric oxalate complex with chloride salt solution at a liquid-to-solid ratio of 40:1 to 10:1, adding 30 wt % aqueous hydrogen peroxide solution with a volume fraction of 0.1-4 vol. % of the system, and mixing uniformly for later use;
(3) Leaching platinum group metals: adding the spent catalyst sieved in step (1) to the platinum group metal lixiviant obtained in step (2) at a liquid-to-solid ratio of 20:1 to 5:1, and stirring under the condition of UV-vis for 10-120 min at a speed of 200-600 r/min to obtain a mixture;
(4) Carrying out solid-liquid separation: carrying out solid-liquid separation of the mixture obtained in step (3), the liquid phase obtained is a mixture of platinum group metal lixivium and ferric oxalate complex, and the solid phase is solid catalyst;
(5) Separating the platinum group metals: placing the liquid phase obtained in step (4) under UV-vis for 2-24 h to obtain a solid-liquid mixture, the solid phase is ferrous oxalate solid, and the liquid phase is platinum group metal lixivium;
(6) Stirring the platinum group metal lixivium obtained in step (5) at 40-80° C. for 2-8 h at a speed of 200-600 r/min to obtain a solid substance enriched with platinum group metals;
(7) Recycling iron: collecting the ferrous oxalate solid obtained in step (5), washing with deionized water, drying at 40-80° C. for 12-24 h, and roasting at 300-700° C. for 4-8 h to obtain ferric oxide;
(8) The ferric oxide obtained in step (7) can be recycled as a reactant for preparing ferric oxalate complex.

The spent catalyst is derived from spent catalyst for industrial treatment of VOCs with platinum group metals as the active component, wherein the platinum group metals include at least one of platinum (Pt), palladium (Pd) and rhodium (Rh).

The wavelength range of the UV-vis is 200-760 nm.

The chloride salt is at least one of sodium chloride, potassium chloride and ammonium chloride.

The ferric oxalate complex is obtained from oxalic acid and ferric oxide under the condition of oil bath, wherein water is used as a solvent, the mass ratio of the oxalic acid to the ferric oxide is 5:1 to 1:1, the liquid-to-solid ratio is 10:1 to 2:1, stirring is carried out at 60-98° C. for 0.5-10 h at a speed of 400-800 r/min, and the concentration of the ferric oxalate complex obtained is 50-370 g/L.

Compared with the prior art, the present invention has the following beneficial effects:
(1) The present invention uses ferric oxalate complex/hydrogen peroxide-chloride salt solution as a solvent for extracting platinum group metals under the condition of UV-vis to produce reactive oxygen species (ROS), converts the platinum group metals from insoluble metallic state to soluble platinum group metal complex, and obtains platinum group metal lixivium to realize the leaching of the platinum group metals. The platinum leaching rate of the method of the present invention can reach more than 97%.
(2) The lixiviant of the present invention is mild and widely exists in the natural environment, which avoids the use of strong acids and bases and volatile organic compounds and avoids secondary pollution;
(3) The method of the present invention is carried out at normal temperature and pressure and has mild operating conditions and simple steps, and the iron in the whole process can be recycled, which greatly reduces the consumption of resources and is suitable for industrial application.

DESCRIPTION OF DRAWINGS

The sole figure is a process flow chart of a method for recovering platinum group metals from spent VOC catalyst by UV-vis in specific embodiments of the present invention.

DETAILED DESCRIPTION

The present invention is further described below in detail in combination with some specific embodiments, but the protection scope of the present invention is not limited to the following content.

The process flow chart of the method for recovering platinum group metals from spent catalyst by UV-vis of the present invention is shown in the sole figure, comprising the following specific steps:
(1) Grinding, milling and sieving spent catalyst;
(2) Thoroughly mixing the powder sample obtained in step (1) with lixiviant, stirring under a UV lamp (200-400 nm, 90-400 mW/cm 2) to obtain a solid-liquid mixture, the solid is catalyst carrier, and the liquid is a mixture of lixivium enriched with platinum group metals and ferric oxalate.
(3) Placing the liquid mixture obtained in step (2) under the UV lamp to obtain a solid-liquid mixture, the solid is ferrous oxalate precipitation and is recycled as a raw material after roasting, and the liquid is lixivium enriched with platinum group metals.

The following embodiments 1-11 and reference examples 1, 2 and 3 adopt the process flow as shown above.

The components of platinum group metals in the spent catalyst used in the following embodiments 1-11 and reference examples 1, 2 and 3 comprise 185-640 g/t Pt, 105-865 g/t Pd and 120-735 g/t Rh.

Embodiment 1

(1) Spent catalyst (637 g/t Pt) is ground, milled and crushed to 200 meshes, and sieved for later use; 40 mL of ferric oxalate complex with the oxalate concentration of 200-220 g/L is uniformly mixed with sodium chloride at a liquid-to-solid ratio of 20:1, and 30% aqueous hydrogen peroxide solution with a volume fraction of 2.2-2.6 vol. % is added and uniformly mixed for later use; and the ground and milled sample is added to lixiviant at a liquid-to-solid ratio of 10:1, and stirred under the condition of UV-vis with a wavelength of 320-400 nm for 10-30 min at a speed of 200-400 r/min to obtain a mixture;
(2) The mixture obtained in step (1) is subjected to solid-liquid separation, the liquid phase obtained is a mixture of platinum group metal lixivium and ferric oxalate complex, and the solid phase is solid catalyst; and the liquid-phase mixture is placed under UV-vis for 24-48 h to obtain a solid-liquid mixture, the solid phase is ferrous oxalate solid, and the liquid phase is platinum group metal lixivium;
(3) The ferrous oxalate solid obtained in step (2) is collected, washed with deionized water, dried at 60-80° C. for 24-48 h, and roasted at 500-700° C. for 4-8 h to obtain ferric oxide which is recycled as a reactant for preparing ferric oxalate complex.

Embodiment 2

In the present embodiment, the concentration of oxalate in the ferric oxalate complex in embodiment 1 is changed from 200-220 g/L to 60-80 g/L, the volume of the ferric oxalate complex is 80 mL, and the other conditions are exactly the same as in embodiment 1.

Embodiment 3

In the present embodiment, the concentration of oxalate in the ferric oxalate complex in embodiment 1 is changed from 200-220 g/L to 270-290 g/L, the volume of the ferric oxalate complex is 80 mL, and the other conditions are exactly the same as in embodiment 1.

Embodiment 4

In the present embodiment, the concentration of oxalate in the ferric oxalate complex in embodiment 1 is changed from 200-220 g/L to 340-360 g/L, the volume of the ferric oxalate complex is 20 mL, and the other conditions are exactly the same as in embodiment 1.

Embodiment 5

In the present embodiment, the concentration of oxalate in the ferric oxalate complex in embodiment 1 is changed from 200-220 g/L to 270-290 g/L, the volume fraction of hydrogen peroxide is changed from 2.2-2.6vol.% to 1.8-2.2vol.%, and the other conditions are exactly the same as in embodiment 1.

Embodiment 6

In the present embodiment, the concentration of oxalate in the ferric oxalate complex in embodiment 1 is changed from 200-220 g/L to 270-290 g/L, the volume fraction of hydrogen peroxide is changed from 2.2-2.6vol.% to 1.4-1.8vol.%, and the other conditions are exactly the same as in embodiment 1.

Embodiment 7

In the present embodiment, the concentration of oxalate in the ferric oxalate complex in embodiment 1 is changed from 200-220 g/L to 270-290 g/L, the volume fraction of hydrogen peroxide is changed from 2.2-2.6vol.% to 0.6-1.0vol.%, and the other conditions are exactly the same as in embodiment 1.

Embodiment 8

In the present embodiment, the concentration of oxalate in the ferric oxalate complex in embodiment 1 is changed from 200-220 g/L to 270-290 g/L, the volume fraction of hydrogen peroxide is changed from 2.2-2.6vol.% to 0.2-0.6vol.%, and the other conditions are exactly the same as in embodiment 1.

Embodiment 9

In the present embodiment, the spent catalyst (637 g/t Pt) in embodiment 1 is replaced with spent catalyst (185 g/t Pt), the concentration of oxalate in the ferric oxalate complex is changed from 200-220 g/L to 340-360 g/L, the volume of the ferric oxalate complex is 80 mL, and the other conditions are exactly the same as in embodiment 1.

Embodiment 10

In the present embodiment, the spent catalyst (637 g/t Pt) in embodiment 1 is replaced with spent catalyst (106 g/t Pd), the concentration of oxalate in the ferric oxalate complex is changed from 200-220 g/L to 340-360 g/L, the volume of the ferric oxalate complex is 80 mL, and the other conditions are exactly the same as in embodiment 1.

Embodiment 11

In the present embodiment, the spent catalyst (637 g/t Pt) in embodiment 1 is replaced with spent catalyst (863 g/t Pd), the concentration of oxalate in the ferric oxalate complex is changed from 200-220 g/L to 340-360 g/L, the volume of the ferric oxalate complex is 80 mL, and the other conditions are exactly the same as in embodiment 1.

Embodiment 12

In the present embodiment, the spent catalyst (637 g/t Pt) in embodiment 1 is replaced with spent catalyst (328 g/t Rh), the concentration of oxalate in the ferric oxalate complex is changed from 200-220 g/L to 340-360 g/L, the volume of the ferric oxalate complex is 80 mL, and the other conditions are exactly the same as in embodiment 1.

Embodiment 13

In the present embodiment, the sodium chloride in embodiment 1 is replaced with potassium chloride of the same mass, the concentration of oxalate in the ferric oxalate complex in embodiment 1 is changed from 200-220 g/L to 270-290 g/L, the volume of the ferric oxalate complex is 80 mL, and the other conditions are exactly the same as in embodiment 1.

Embodiment 14

In the present embodiment, the wavelength of the UV lamp in embodiment 1 is changed from 320-400 nm to 200-320 nm, the concentration of oxalate in the ferric oxalate complex in embodiment 1 is changed from 200-220 g/L to 270-290 g/L, the volume of the ferric oxalate complex is 80 mL, and the other conditions are exactly the same as in embodiment 1.

Embodiment 15

In the present embodiment, the wavelength of the UV lamp in embodiment 1 is changed from 320-400 nm to 400-760 nm, the concentration of oxalate in the ferric oxalate complex in embodiment 1 is changed from 200-220 g/L to 270-290 g/L, the volume of the ferric oxalate complex is 80 mL, and the other conditions are exactly the same as in embodiment 1.

Reference Example 1

Compared with embodiment 1, no ferric oxalate complex is added in the present reference example, and the other conditions are exactly the same as in embodiment 1.

Reference Example 2

Compared with embodiment 1, no hydrogen peroxide is added in the present reference example, and the other conditions are exactly the same as in embodiment 1.

Reference Example 3

Compared with embodiment 1, the volume fraction of hydrogen peroxide is changed from 2.2-2.6vol.% to 0.1-

0.4vol.% in the present reference example, and the other conditions are exactly the same as in embodiment 1.

The platinum group metal lixivium obtained in embodiments 1-15 and reference examples 1-3 is detected by an inductively coupled plasma optical emission spectrometry (ICP-OES), and the leaching rate of platinum group metals is calculated.

The leaching rate of platinum group metals is calculated as follows:

Leaching rate (%) of platinum group metals =

$$\frac{\text{Mass of platinum group metals in lixivium}}{\text{Mass of platiunum group metals in spent catalyst}} \times 100\%$$

The leaching conditions of the methods in embodiments 1-15 and reference examples 1-3 are shown in Table 1:

TABLE 1

| | Platinum Group Metals | Leaching Conditions |
|---|---|---|
| Embodiment 1 | Pt | Pt = 637 g/t, $C_{oxalate}$ = 200-220 g/L, $V_{oxalate}$ = 40 mL, $\Phi_{hydrogen\ peroxide}$ = 2.2-2.6 vol. %, and chloride is sodium chloride |
| Embodiment 2 | Pt | $C_{oxalate}$ = 60-80 g/L, $V_{oxalate}$ = 80 mL, and the other conditions are the same as in embodiment 1 |
| Embodiment 3 | Pt | $C_{oxalate}$ = 270-290 g/L, $V_{oxalate}$ = 80 mL, and the other conditions are the same as in embodiment 1 |
| Embodiment 4 | Pt | $C_{oxalate}$ = 340-360 g/L, $V_{oxalate}$ = 20 mL, and the other conditions are the same as in embodiment 1 |
| Embodiment 5 | Pt | $C_{oxalate}$ = 270-290 g/L, $\Phi_{hydrogen\ peroxide}$ = 1.8-2.2 vol. %, and the other conditions are the same as in embodiment 1 |
| Embodiment 6 | Pt | $C_{oxalate}$ = 270-290 g/L, $\Phi_{hydrogen\ peroxide}$ = 1.4-1.8 vol. %, and the other conditions are the same as in embodiment 1 |
| Embodiment 7 | Pt | $C_{oxalate}$ = 270-290 g/L, $\Phi_{hydrogen\ peroxide}$ = 0.6-1.0 vol. %, and the other conditions are the same as in embodiment 1 |
| Embodiment 8 | Pt | $C_{oxalate}$ = 270-290 g/L, $\Phi_{hydrogen\ peroxide}$ = 0.2-0.6 vol. %, and the other conditions are the same as in embodiment 1 |
| Embodiment 9 | Pt | Pt = 185 g/t, $C_{oxalate}$ = 340-360 g/L, $V_{oxalate}$ = 80 mL, and the other conditions are the same as in embodiment 1 |
| Embodiment 10 | Pd | Pd = 106 g/t, $C_{oxalate}$ = 340-360 g/L, $V_{oxalate}$ = 80 mL, and the other conditions are the same as in embodiment 1 |
| Embodiment 11 | Pd | Pd = 863 g/t, $C_{oxalate}$ = 340-360 g/L, $V_{oxalate}$ = 80 mL, and the other conditions are the same as in embodiment 1 |
| Embodiment 12 | Rh | Rh = 328 g/t, $C_{oxalate}$ = 340-360 g/L, $V_{oxalate}$ = 80 mL, and the other conditions are the same as in embodiment 1 |
| Embodiment 13 | Pt | Chloride is potassium chloride, $C_{oxalate}$ = 270-290 g/L, $V_{oxalate}$ = 80 mL, and the other conditions are the same as in embodiment 1 |
| Embodiment 14 | Pt | $\lambda$ = 200-320 nm, $C_{oxalate}$ = 270-290 g/L, $V_{oxalate}$ = 80 mL, and the other conditions are the same as in embodiment 1 |
| Embodiment 15 | Pt | $\lambda$ = 400-760 nm, $C_{oxalate}$ = 270-290 g/L, $V_{oxalate}$ = 80 mL, and the other conditions are the same as in embodiment 1 |
| Reference example 1 | Pt | No ferric oxalate complex is added, and the other conditions are the same as in embodiment 1 |
| Reference example 2 | Pt | No hydrogen peroxide is added, and the other conditions are the same as in embodiment 1 |
| Reference example 3 | Pt | $\Phi_{hydrogen\ peroxide}$ = 0.1-0.4 vol. %, and the other conditions are the same as in embodiment 1 |

The leaching rates of platinum group metals in the methods in embodiments 1-15 and reference examples 1-3 are shown in Table 2:

TABLE 2

| | Platinum Group Metals | Leaching Rate (%) |
|---|---|---|
| Embodiment 1 | Pt | 98.91 |
| Embodiment 2 | Pt | 90.20 |
| Embodiment 3 | Pt | 99.02 |
| Embodiment 4 | Pt | 98.75 |
| Embodiment 5 | Pt | 97.64 |
| Embodiment 6 | Pt | 99.83 |
| Embodiment 7 | Pt | 97.92 |
| Embodiment 8 | Pt | 98.65 |
| Embodiment 9 | Pt | 99.71 |
| Embodiment 10 | Pd | 95.42 |
| Embodiment 11 | Pd | 90.06 |
| Embodiment 12 | Rh | 91.43 |
| Embodiment 13 | Pt | 98.77 |
| Embodiment 14 | Pt | 97.64 |
| Embodiment 15 | Pt | 97.23 |
| Reference example 1 | Pt | 11.48 |
| Reference example 2 | Pt | 85.62 |
| Reference example 3 | Pt | 97.22 |

It can be seen from comparison of embodiments 1-4 that when the concentration of oxalate in the ferric oxalate complex used in the present invention is 50-370 g/L, the leaching effect of platinum group metals is good. It can be seen from comparison of embodiments 1 and 5-8 that when the volume fraction of hydrogen peroxide used in the present invention is 0.2-2.6vol.%, the leaching rate of platinum group metals is above 97%, and the leaching effect is the best. It can be seen from comparison of embodiments 1 and 9-12 that the present invention is suitable for the leaching of platinum group metals from spent catalyst, and the leaching rate is above 90%. It can be seen from comparison of embodiments 1 and 14-15 that the present invention can effectively leach platinum group metals from spent catalyst in the wave band of UV-vis, and the leaching rate is above 97%. It can be seen from comparison of embodiment 1 and reference examples 1-3 that the ferric oxalate complex can leach most of platinum group metals, and the addition of hydrogen peroxide further enhances the leaching of platinum group metals.

It can be seen from the test results of the above embodiments and reference examples that the method for recovering platinum group metals from spent catalyst of the present invention has a leaching rate of platinum group metals above 90%, wherein the leaching rate of Pt can reach more than 97%, and the method of the present invention has mild operating conditions without secondary pollution and is easy to realize industrial application.

The applicant declares that the above only describes specific embodiments of the present invention, but the protection scope of the present invention is not limited thereto. Those skilled in the art should understand that any change or replacement contemplated easily by those skilled in the art within the technical scope disclosed by the present invention shall be included in the protection scope and disclosure scope of the present invention.

The invention claimed is:

1. A method for leaching platinum group metals from spent catalyst by UV-vis, which uses a platinum group metal lixiviant for extracting platinum group metals from spent catalyst under the condition of UV-vis to obtain platinum group metal lixivium, so as to recover platinum group metals from spent catalyst, comprising the following steps:

(1) shearing spent catalyst, crushing to 80-200 meshes, and sieving;
(2) preparing the platinum group metal lixiviant: uniformly mixing ferric oxalate complex with chloride salt solution at a liquid-to-solid ratio of 40:1 to 10:1, adding 30 wt % aqueous hydrogen peroxide solution with a volume fraction of 0.1-4 vol. % of the system, and mixing uniformly; wherein the chloride salt is at least one of sodium chloride, potassium chloride and ammonium chloride;
(3) leaching platinum group metals: adding the spent catalyst sieved in step (1) to the platinum group metal lixiviant obtained in step (2) at a liquid-to-solid ratio of 20:1 to 5:1, and stirring under the condition of UV-vis for 10-120 min at a speed of 200-600 r/min to obtain a mixture, wherein the wavelength range of the UV-vis is 200-760 nm;
(4) carrying out solid-liquid separation: carrying out solid-liquid separation of the mixture obtained in step (3), the liquid phase obtained is a mixture of platinum group metal lixivium and ferric oxalate complex, and the solid phase is solid catalyst;
(5) separating the platinum group metals: placing the liquid phase obtained in step (4) under UV-vis for 2-24 h to obtain a solid-liquid mixture, the solid phase is ferrous oxalate solid, and the liquid phase is platinum group metal lixivium;
(6) stirring the platinum group metal lixivium obtained in step (5) at 40-80° C. for 2-8 h at a speed of 200-600 r/min to obtain a solid substance enriched with platinum group metals;
(7) recycling iron: collecting the ferrous oxalate solid obtained in step (5), washing with deionized water, drying at 40-80° C. for 12-24 h, and roasting at 300-700° C. for 4-8 h to obtain ferric oxide;
(8) the ferric oxide obtained in step (7) can be recycled as a reactant for preparing ferric oxalate complex.

2. The method according to claim 1, wherein the spent catalyst is derived from spent catalyst for industrial treatment of VOCs with platinum group metals as the active component, and the platinum group metals include at least one of platinum (Pt), palladium (Pd) and rhodium (Rh).

3. The method according to claim 1, wherein the ferric oxalate complex is obtained from oxalic acid and ferric oxide under the condition of oil bath, wherein water is used as a solvent, a mass ratio of the oxalic acid to the ferric oxide is 5:1 to 1:1, a liquid-to-solid ratio is 10:1 to 2:1, stirring is carried out at 60-98° C. for 0.5-10 h at a speed of 400-800 r/min, and a concentration of the ferric oxalate complex obtained is 50-370 g/L.

* * * * *